US008799160B2

(12) United States Patent
Smith et al.

(10) Patent No.: US 8,799,160 B2
(45) Date of Patent: *Aug. 5, 2014

(54) SYSTEM AND METHOD FOR PRICING OF MERCHANT ACCOUNTS

(71) Applicant: Paymentech, L.P., Dallas, TX (US)

(72) Inventors: Jeremy A. Smith, Dallas, TX (US); Kathleen Adams, Haslet, TX (US); Mike Jarosz, Dallas, TX (US); Etta J. Angton, Murphy, TX (US); Greg Everly, Coppell, TX (US); Robert K. Holt, Dallas, TX (US); Daniel Lingerfelt, Greenville, TX (US)

(73) Assignee: Paymentech, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/035,852

(22) Filed: Sep. 24, 2013

(65) Prior Publication Data

US 2014/0025568 A1 Jan. 23, 2014

Related U.S. Application Data

(63) Continuation of application No. 12/892,683, filed on Sep. 28, 2010, now Pat. No. 8,543,502, which is a continuation of application No. 10/919,979, filed on Aug. 17, 2004, now Pat. No. 7,805,367.

(51) Int. Cl.
*G06Q 40/00* (2012.01)
*G06Q 30/04* (2012.01)

(52) U.S. Cl.
CPC ..................... *G06Q 30/04* (2013.01)
USPC ........ 705/40; 705/5; 705/29; 705/39; 705/80; 705/37; 705/41; 705/7.35; 705/7.29; 705/400; 705/26.1

(58) Field of Classification Search
USPC .......... 705/41, 39, 80, 37, 35, 29, 7.35, 7.29, 705/400, 26.1; 235/383
See application file for complete search history.

(56) References Cited

U.S. PATENT DOCUMENTS

| 5,999,914 | A | 12/1999 | Blinn et al. |
| 6,018,718 | A | 1/2000 | Walker et al. |
| 6,263,315 | B1 | 7/2001 | Talluri |

(Continued)

FOREIGN PATENT DOCUMENTS

| WO | 0152164 | 7/2001 |
| WO | 03054819 | 7/2003 |

OTHER PUBLICATIONS

Paymetric, Paymentech Offer, Microsoft Customers Solution, PR Newswire, Nov. 5, 2002.

*Primary Examiner* — Tien Nguyen
(74) *Attorney, Agent, or Firm* — Jackson Walker L.L.P.; Christopher J. Rourk

(57) ABSTRACT

A system for managing merchant payment transaction processing accounts is provided. The system includes a merchant initialization system that receives merchant account data from a user, such as to provide a quote to the merchant for payment processing. A transaction pricing system receives the merchant account data and provides transaction pricing data for payment transaction processing in response to the merchant account information. User access to one or more merchant account pricing algorithms that are used generate the merchant account pricing data in response to the merchant account data is restricted to a predetermined set of users, so as to prevent unauthorized users from obtaining access to the merchant account pricing algorithms.

20 Claims, 4 Drawing Sheets

(56) References Cited

U.S. PATENT DOCUMENTS

| | | |
|---|---|---|
| 6,282,522 B1 * | 8/2001 | Davis et al. ............ 705/41 |
| 6,925,449 B2 * | 8/2005 | Levine ............ 705/400 |
| 7,010,494 B2 | 3/2006 | Etzioni et al. |
| 7,181,408 B2 * | 2/2007 | Saunders ............ 705/20 |
| 7,269,571 B2 * | 9/2007 | Kar ............ 705/80 |
| 7,320,428 B2 | 1/2008 | Sisko et al. |
| 7,343,319 B1 | 3/2008 | Walker et al. |
| 7,392,222 B1 | 6/2008 | Hamilton et al. |
| 8,069,113 B2 * | 11/2011 | Elterich ............ 705/39 |
| 2001/0051932 A1 | 12/2001 | Srinivasan et al. |
| 2002/0059058 A1 * | 5/2002 | Doolin et al. ............ 704/10 |
| 2002/0091635 A1 * | 7/2002 | Dilip et al. ............ 705/39 |
| 2002/0099622 A1 | 7/2002 | Langhammer |
| 2002/0107697 A1 * | 8/2002 | Jensen ............ 705/1 |
| 2002/0120559 A1 | 8/2002 | O'Mara et al. |
| 2003/0023505 A1 | 1/2003 | Eglen et al. |
| 2003/0023538 A1 * | 1/2003 | Das et al. ............ 705/37 |
| 2003/0233286 A1 | 12/2003 | Hahn-Carlson et al. |
| 2003/0233325 A1 | 12/2003 | Belyi |
| 2004/0024707 A1 | 2/2004 | Perre et al. |
| 2004/0054625 A1 | 3/2004 | Kellogg et al. |
| 2004/0088238 A1 | 5/2004 | Gilson et al. |
| 2004/0111343 A1 | 6/2004 | Lindvall et al. |
| 2004/0172373 A1 | 9/2004 | Chen |
| 2004/0243506 A1 | 12/2004 | Das |
| 2005/0080685 A1 | 4/2005 | Blum |
| 2005/0240477 A1 | 10/2005 | Friday et al. |
| 2006/0036538 A1 | 2/2006 | Griffis et al. |
| 2006/0061170 A1 | 3/2006 | Massara et al. |
| 2006/0136315 A1 | 6/2006 | Muthiki et al. |

* cited by examiner

SYSTEM AND METHOD FOR PRICING OF MERCHANT ACCOUNTS

CROSS-REFERENCE TO RELATED APPLICATIONS

This is a continuation of U.S. patent application Ser. No. 12/892,683, filed Sep. 28, 2010, now U.S. Pat. No. 8,543,502, which is a continuation of U.S. patent application Ser. No. 10/919,979, filed Aug. 17, 2004, now U.S. Pat. No. 7,805,367, and entitled "SYSTEM AND METHOD FOR PRICING OF MERCHANT ACCOUNTS," which are hereby incorporated by reference for all purposes.

FIELD OF THE INVENTION

The present invention pertains to the field of payment processing systems, and more particularly to a system and method for providing pricing data for use in initializing and maintaining merchant accounts that allows a user to provide pricing estimates to prospective merchants without providing the user with access to proprietary pricing models.

BACKGROUND OF THE INVENTION

Merchant account initialization and maintenance for payment transaction processing accounts is usually performed manually for merchants that operate point of sale terminals where a customer can present a payment card, such as by running the magnetic stripe of the payment card through a magnetic stripe reader. For these accounts, the merchant calls a sales representative who obtains merchant account information and uses that merchant account information to provide pricing data to the merchant.

This prior art process for providing pricing information for merchant accounts suffers from many drawbacks. In particular, the merchant is given information after the sales account representative has consulted reference tables or other systems where it is not possible to see the effect of a change in value of a single variable on a merchant's costs. Likewise, the user that provides the pricing data to the merchant has access to proprietary pricing data, and can inadvertently or intentionally disclose that information to others.

SUMMARY OF THE INVENTION

In accordance with the present invention, a system and method for managing merchant payment transaction processing accounts are provided that overcome known problems with managing merchant payment transaction processing accounts.

In particular, a system and method for managing merchant payment transaction processing accounts are provided that allow users to provide information to merchants and to manage merchant accounts without giving the users access to proprietary pricing data for processing merchant payment transactions.

In accordance with an exemplary embodiment of the present invention, a system for managing merchant payment transaction processing accounts is provided. The system includes a merchant initialization system that receives merchant account data from a user, such as to provide a pricing quote to the merchant for payment processing. A transaction pricing system receives the merchant account data and provides transaction pricing data for payment transaction processing in response to the merchant account information. User access to one or more merchant account pricing algorithms that are used to generate the merchant account pricing data in response to the merchant account data is restricted to a predetermined set of users, so as to prevent unauthorized users from obtaining access to the merchant account pricing algorithms.

The present invention provides many important technical advantages. One important technical advantage of the present invention is a system and method for managing merchant payment transaction processing accounts that allows a user to obtain pricing information without giving the user access to proprietary information, such as tiered pricing structures that are developed using knowledge that has been accumulated for classes of merchants.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

Figure 1:
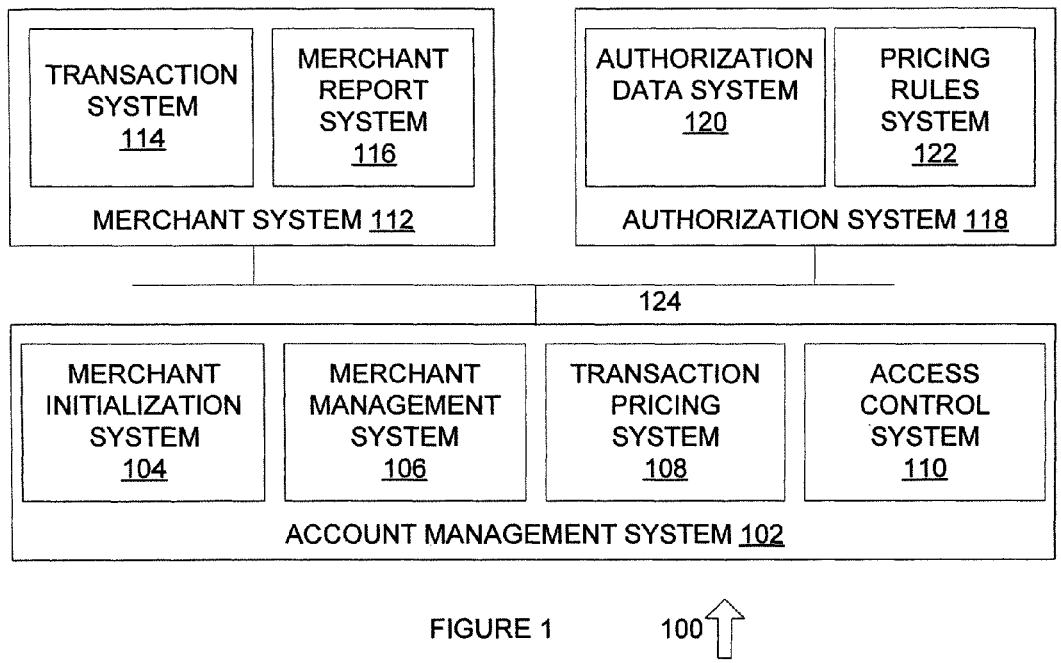
FIG. 1 is a diagram of a system for managing merchant payment transaction processing accounts in accordance with an exemplary embodiment of the present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of a system 100 for managing merchant payment transaction processing accounts in accordance with an exemplary embodiment of the present invention. System 100 allows pricing to be determined by a user when the merchant payment transaction processing accounts are being set up or maintained without allowing the user to access proprietary or confidential pricing information for such merchant payment transaction processing accounts.

System 100 includes account management system 102, which can be implemented in hardware, software, or a suitable combination of hardware and software, and which can be one or more software systems operating on a general purpose processing platform. As used herein, a hardware system can include discrete semiconductor devices, an application-specific integrated circuit, a field programmable gate array or other suitable devices. A software system can include one or more objects, agents, threads, lines of code, subroutines, separate software applications, user-readable (source) code, machine-readable (object) code, two or more lines of code in two or more corresponding software applications, databases, or other suitable software architectures. In one exemplary embodiment, a software system can include one or more lines of code in a general purpose software application, such as an operating system, and one or more lines of code in a specific purpose software application.

Account management system 102 allows a merchant payment transaction processing account to be configured for a merchant based upon merchant account data. In one exemplary embodiment, merchant account data can be received by a user that is an employee of a company that performs payment transaction processing for merchants, and the user can provide the merchant with pricing information so as to allow the merchant to make a decision on whether to use the company's services. In this exemplary embodiment, the user interacts with the merchant in person or over the telephone, but merchant account data can also or alternatively be obtained by prompting the merchant to directly enter the information, such as via a web interface, voice response interface, or other suitable interfaces.

Account management system 102 is coupled to merchant system 112 and authorization system 118 over communications medium 124 or other suitable communications media. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. In one exemplary embodiment, systems and components are coupled to other systems and components through intervening systems and components, such as through an operating system. Communications medium 124 can be a local area network, a wide area network, a public network such as the Internet, the public switched telephone network, wireless media, fiber optic media, other suitable media, or a suitable combination of such media.

Account management system 102 can receive data from merchant system 112 by a telephonic communication with a user operating account management system 102, through data transmission over communications medium 124, or in other suitable configurations. Likewise, account management system 102 can receive data from authorization system 118 through telephonic communications, from price lists that may be periodically distributed from authorization system 118 to operators of payment processing systems, by electronic data transmission over communications medium 124, or in other suitable manners.

Account management system 102 includes merchant initialization system 104, merchant management system 106, transaction pricing system 108, and access control system 110, each of which can be implemented in hardware, software, or a suitable combination of hardware and software, and which can be one or more software systems operating on a general purpose processing platform. In one exemplary embodiment, some systems of account management system 102 can be accessible only to authorized users, so as to limit user access to proprietary data which could be disclosed to merchants, competitors, or other parties.

Merchant initialization system 104 allows the user to enter merchant account data for the purpose of obtaining merchant payment transaction processing account pricing. In one exemplary embodiment, merchant initialization system 104 can allow a user to enter merchant data such as a merchant name, an authorization network or group of authorization networks that the merchant intends to use, a pricing type, a target rate, a pricing method, a contract term, a contract type, a user identifier, and other suitable data. Merchant initialization system 104 then interfaces with transaction pricing system 108 to generate pricing data that can be used by the merchant to determine whether to retain the services of the payment processor that is operating system 100, as well as to allow the user to determine whether the merchant should be referred to another payment processor, whether approval from a management level will be needed to authorize processing for the merchant, or other suitable information.

Merchant initialization system 104 can allow the user to enter the merchant account data in all data fields, can populate the fields with typical merchant account data numbers and allow user to select or change the field data as needed, can include one or more pull down menus that provide typical or standardized entries for fields, can provide self populating fields based on other data entries that are related, can obtain merchant account data from another system, or can provide other suitable functions for entry of merchant account data.

Merchant management system 106 presents current merchant account data for an existing merchant. For example, the actual transaction processing data for a merchant versus target transaction processing data based on the target realization rate data for the merchant can be generated so as to allow the user to modify the merchant account data as necessary to reflect actuals, to make changes in merchant activity based on changes in the merchant account data, or to perform other suitable functions. In one exemplary embodiment, merchant management system 106 can allow a user to determine whether merchants have been meeting threshold requirements for contribution margin, sales volumes, average bank card ticket, or other suitable quantities that affect merchant profitability, and to make modifications to the merchant account pricing structure or parameters so as to provide a price that more accurately reflects the costs and risks of processing transactions for that merchant.

Transaction pricing system 108 allows a user to select transaction pricing models and parameters for a merchant. In one exemplary embodiment, the merchant can select individual transaction pricing variables that are used to determine the cost for transactions. Likewise, transaction pricing system 108 can allow transaction pricing to be based on a merchant class and tiers of pricing activity, such as tiers established through historical trends observed for merchant classes. Other suitable transaction pricing selections can also be implemented using transaction pricing system 108.

Access control system 110 controls user access to merchant initialization system 104, merchant management system 106, transaction pricing system 108, or other suitable systems. In one exemplary embodiment, access can be controlled based upon the user's position within the organization operating system 100, based upon the user's operation of merchant initialization system 104, merchant management system 106, transaction pricing system 108, or other suitable systems, or based on other suitable features. Access control system 110 allows proprietary and confidential merchant pricing information to be protected from access by lower level employees that may have greater mobility in the work force labor market, so as to prevent such employees from taking proprietary pricing information to competitors or disclosing such information to merchants.

Merchant system 112 includes transaction system 114 and merchant report system 116, which can each be implemented in hardware, software or suitable combination of hardware and software, and which can be one or more software systems operating on a general purpose server platform. In one exemplary embodiment, transaction system 114 submits transaction authorization requests through account management system 102. In this exemplary embodiment, transaction system 114 receives transaction pricing data from account management system 102 that determines the cost of processing the payment transaction. For example, a merchant may be assessed a first fee for processing a payment card transaction if the merchant reads the payment card data using a magnetic stripe reader (also referred to as a card present transaction), a second fee that is higher than the first fee for processing the transaction if the payment card data is keyed in by a user (also referred to as a card not present transaction), and a third fee that is higher than the second fee if the card not present transaction is not submitted for payment within a predetermined time period from the time the card not present transaction is submitted for authorization. The merchant can thus control transaction processing costs by ensuring that transactions are processed in accordance with requirements for obtaining the lowest processing fee, where possible.

Merchant report system 116 receives transaction pricing data from account management system 102 and generates a report for a user of merchant system 112. In one exemplary embodiment, merchant report system 116 can present transaction pricing data prior to initiation of account, transaction pricing criteria based on historical transaction data processed for transactions processed by merchant system 112, or other suitable data. In this exemplary embodiment, merchant report system 116 can allow a merchant to determine whether they are submitting transactions for processing so as to receive the lowest possible transaction processing price, and to take corrective measures to avoid being assessed higher charges. For example, a merchant at a location where customers typically present payment cards to pay for transactions may use merchant report system 116 to determine that a large number of payment card transactions are being keyed in instead of read with a magnetic stripe reader, based on the rate being charged for the transactions. This can occur when payment card reading equipment is broken and employees are forced to key in the payment card data, such that the transactions are priced at higher rates for card not present transactions even though the cards are present. Likewise, a merchant may take other corrective measures to reduce transaction processing costs based on data obtained through merchant report system 116.

Authorization system 118 includes authorization data system 120 and pricing rules system 122, each of which can be implemented in hardware, software, or a suitable combination of hardware and software, and which can be one or more software systems operating on a general purpose processing platform. Authorization data system 120 provides authorization data to account management system 102, such as per transaction charge percentages, per transaction flat fees, charge back fees, or other suitable data. In one exemplary embodiment, this data can be set by payment card associations or other entities that determine payment transaction pricing and rules. This information can be provided to merchant systems 112 for each transaction, in periodic reports, or in other suitable manners.

Pricing rules system 122 provides pricing rules data to account management system 102. In one exemplary embodiment, pricing rules system 122 can provide pricing rules data electronically, as a document that is periodically mailed to payment processors, or in other suitable manners. Likewise, pricing rules system 122 can provide payment processor specific pricing rules, such as negotiated rates, volume discounts, or other suitable data.

In operation, system 100 allows a user to provide pricing data when a merchant account is being set up or maintained so as to ensure that the pricing for processing of merchant payment transactions reflects the actual merchant account data and to avoid incurring losses on processing merchant payment transactions for high-risk merchants, as well as to allow competitive pricing to be used for low-risk merchants. System 100 allows a user to receive merchant account data and to select merchant payment transaction processing pricing criteria that reflect the levels of risk associated with the type of merchant, the type of transaction, the payment vehicles accepted, and other suitable data. In this manner, system 100 allows a payment processor to improve the quality of service and to better classify merchants and fees associated with merchants based upon risk factors inherent to those merchants, industries, payment types, and other suitable criteria.

Figure 2:
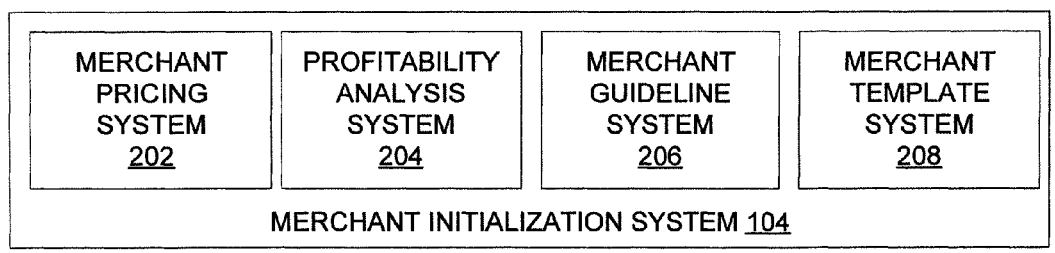
FIG. 2 is a diagram of system for performing merchant initialization in accordance with an exemplary embodiment of the present invention.

FIG. 2 is a diagram of system 200 for performing merchant initialization in accordance with an exemplary embodiment of the present invention. System 200 includes merchant initialization system 104 and merchant pricing system 202, profitability analysis system 204, merchant guideline system 206, and merchant template system 208, each of which can be implemented in hardware, software, or a suitable combination of hardware and software and which can be one or more software systems operating on a general purpose processing platform.

Merchant pricing system 202 provides merchant pricing data based on merchant account data, a class associated with a merchant or other suitable merchant criteria. For example, merchant pricing data can be generated based on: gross bank card sales (such as where discounts are provided for merchants with greater sales); average bank card ticket (such as where discounts are given for merchants having larger tickets and thus smaller numbers of transactions that need to be managed); bank card initiating or network share (such as where different fees apply for different networks, such as Visa, MasterCard, American Express and Discover); discount rate (such as where the merchant is charged a fee to cover additional, non-itemized costs); check card or debit authorization percentage (such as where different fees are applied for check card or debit authorization), return percentage (such as where a fee is associated with each return), number of locations (such as where a fee is associated with processing payments at each location); number of chains (such as where a fee is associated with processing payments for each chain); terminal type (such as where a fee is associated with processing payments for different terminal types); charge back percentage (such as to approximate the cost of fees charged for processing charge backs); whether the merchant is being provided with supplies or billed for supplies (such as where a fee is associated with providing supplies); funding type (such as where a fee is associated with different funding types); funding outlet (such as where a fee is associated with funding different locations or bank accounts); PINless debit (such as where a fee is associated with processing PINless debit payments); PIN authorized debit (such as where a fee is associated with processing PIN authorized debits); voice authorization fees (such as where a merchant fee is associated with processing a voice authorization for the merchant); charge back fees (such as where a merchant fee is associated with processing a charge back for the merchant); monthly service fees, annual fees; Address Verification Service fees; batch settlement fees; wire fees; frame relay speed; inbound client service call percentage (such as where a fee is associated with processing inbound client service calls); outbound client service call percentage (such as where a fee is associated with processing outbound client service calls); Internet set up fee;

Internet monthly fee; wireless set up fee; wireless monthly fee; frame relay fee; rebate percentage on rate; rebate dollars on capture; or other suitable data.

Profitability analysis system 204 generates profitability analysis data based on merchant account data. In one exemplary embodiment, profitability analysis system 204 can generate contribution margin data that includes a total dollar amount for contribution margin (net revenue minus expense), a percentage amount for contribution margin (net revenue minus expense as a percentage of total sales volume), a per transaction contribution margin (net revenue minus expense divided by total number of transactions), or other suitable data. In this exemplary embodiment, profitability analysis system 204 allows the user to determine the dollar amount, percentage profit, or other suitable figures of merit for determining whether or not to accept a merchant based upon merchant account data.

Merchant guideline system 206 receives merchant account data and compares the merchant account data with merchant guidelines. In one exemplary embodiment, merchant guideline system 206 can provide suggested ranges for merchant account acceptance, so as to allow the user to determine whether a merchant will require additional approval levels, whether the merchant is not processing enough transactions to justify handling the merchant account, or other suitable data. Likewise, merchant guideline system 206 can indicate to a user where changes could be made to bring a merchant into compliance with programs offered by the payment processor. For example, if a merchant indicates that their average ticket size is expected to be a first value and that first value is close to but still under a minimum average ticket size, merchant guideline system 206 can generate an indication that the merchant should be asked to verify the average ticket size. Likewise, other suitable data can be provided.

Merchant template system 208 allows a user to save templates for use in setting up merchant accounts. In one exemplary embodiment, a user may set up a merchant account for a merchant in a particular industry and having predetermined characteristics, and can then save that account as a template for use to initially populate data fields in a merchant application for other merchants in that field. Likewise, merchant template system 208 can be used to auto-complete forms based on acceptable minimum levels, required rates and target levels from payment card processing entities, or other suitable data.

In operation, system 200 allows a merchant to be initialized so as to allow the user to determine whether the merchant can be handled based on transaction volume and amounts, charge back amounts, or other suitable criteria. Likewise, system 200 allows the user to quickly analyze a merchant to determine whether transactions for the merchant can be profitably processed, to determine whether additional approval is necessary, or to determine whether other suitable data is needed.

Figure 3:
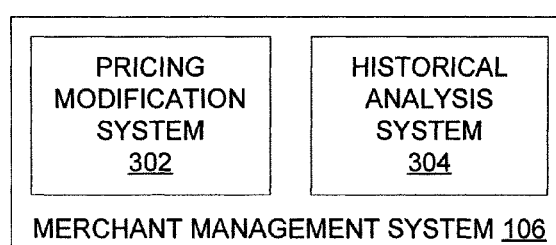
FIG. 3 is a diagram of system for managing merchants in accordance with an exemplary embodiment of the present invention.

FIG. 3 is a diagram of system 300 for managing merchants in accordance with an exemplary embodiment of the present invention. System 300 includes merchant management system 106, pricing modification system 302, and historical analysis system 304, each of which can be implemented in hardware, software, or a suitable combination of hardware and software, and which can be one or more software systems operating on a general purpose processing platform.

Pricing modification system 302 presents pricing data for merchant accounts and indicates levels at which modifications may require approval within the organization. In one exemplary embodiment, if it is determined that the contribution margin thresholds, gross amounts or other suitable data are below certain predetermined values, then approval for acceptance or renewal of a merchant account can require predetermined levels of management oversight within an organization. Pricing modification system 302 can generate notification data to appropriate personnel, status data regarding whether a request has been approved or denied, or other suitable data.

Historical analysis system 304 analyzes historical payment transaction data over a predetermined period of time for a merchant to generate actual values for merchant payment account processing parameters. In one exemplary embodiment, a merchant account may be configured with a first tier of payment transaction processing pricing based on an assumption that the merchant will process a predetermined number of types of payment transactions, have a predetermined percentage of charge backs, or other predetermined criteria. Historical analysis system 304 can compare the actual historical payment transaction data for a merchant versus the assumed values, so as to allow a user to determine whether pricing modification for the merchant is necessary, whether the merchant can be offered a more advantageous or commercially attractive rate so as to keep the merchant's business, or other suitable data.

In operation, system 300 allows a user to manage a merchant account by allowing the user to modify merchant criteria, to determine historical data for a merchant, or to otherwise perform oversight and management of a merchant payment account.

Figure 4:
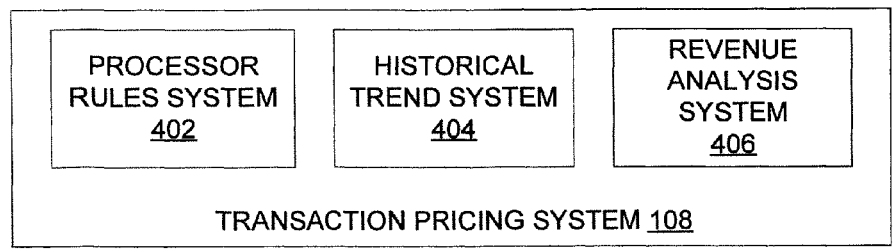
FIG. 4 is a diagram of a system for providing transaction pricing in accordance with an exemplary embodiment of the present invention.

FIG. 4 is a diagram of a system 400 for providing transaction pricing in accordance with an exemplary embodiment of the present invention. System 400 includes transaction pricing system 108, processor rules system 402, historical trend system 404, and revenue analysis system 406, each of which can be implemented in hardware, software, or a suitable combination of hardware and software, and which can be one or more software systems operating on a general purpose processing platform.

Processor rules system 402 receives processor rules data from one or more authorization systems and presents the processor rules to a user. In one exemplary embodiment, processor rules system 402 can be updated by a payment processing organization, can receive processor rules data electronically, or can perform other suitable functions. These processor rules can include target rate data with a rate based on a percentage of the amount of the transaction component, a flat rate component, and can be based on one or more transaction variables. Transaction variables can include whether the transaction is a retail transaction; a restaurant transaction; a hotel—retail transaction; a hotel—mail/telephone order transaction; a tip transaction; a lodging transaction; an auto rental transaction; an emerging market retail transaction; an emerging market mail/telephone order transaction; an emerging market—public sector transaction; a mail/telephone order with Address Verification Service transaction; a mail/telephone order without Address Verification Service transaction; a mail/telephone order transaction for an E-commerce entity; a supermarket transaction; a retail service station transaction; a small ticket transaction; a quick service restaurant transaction; a convenience store transaction; an Express Pay transaction; a business to business transaction; a large ticket transaction; a cash advance transaction; a standard account transaction; or other suitable factors. Likewise, these target rates can include percentage components and fixed components that function as the type of target rate category, and based on the card initiating organization such as Visa, MasterCard, Discover, or other suitable variables.

Historical trend system 404 allows historical trends for classes of merchants to be monitored and analyzed so as to create tiers of processing fee and pricing data. In one exemplary embodiment, merchants can be categorized based upon one or more predetermined classes, and the historical transaction data for those merchants can be grouped so as to generate a profile for each class of merchant. In this exemplary embodiment, it may be determined that a particular class of merchant, such as a small ticket retail merchant, has an approximate 50% Visa transaction realization, 25% MasterCard, 20% American Express, 3% Discover, and 2% miscellaneous others. In order to simplify the determination of merchant fees, it may be advantageous to offer small ticket merchants a simplified transaction pricing of having target components of Visa, MasterCard, and a scaling factor for the merchant. In this exemplary embodiment, historical trend system 404 can be used to simplify the number of options for a merchant while improving the net margin for the payment processor. In this manner, the payment processor can decrease the risk associated with processing payment transactions for merchants.

Revenue analysis system 406 receives overall volume data, number of transactions data, estimated charge back data, and other suitable criteria and data and generates revenue estimates or actual revenue data for merchants. In one exemplary embodiment, revenue analysis system 406 can allow the revenue for a new merchant to be estimated, can provide comparisons between the estimates for the new merchant and the actual revenues realized after a predetermined period of time such as one contract period, and can perform other suitable functions.

In operation, system 400 allows transactions to be priced for merchant accounts so as to improve revenue and decrease risk. System 400 allows processor rules to be upgraded, allows historical data for classes of merchants to be used to simplify the merchant registration and management process, and performs other suitable processes.

Figure 5:
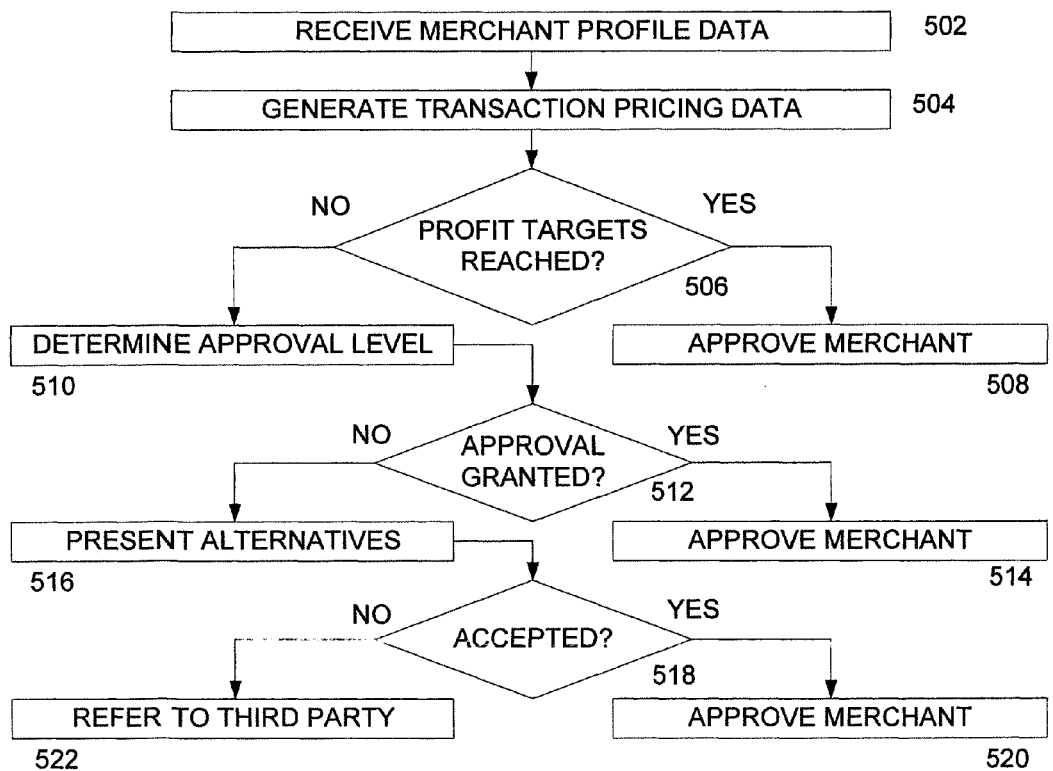
FIG. 5 is a flow chart of a method for managing merchant payment transaction processing accounts in accordance with an exemplary embodiment of the present invention.

FIG. 5 is a flow chart of a method 500 for managing merchant payment transaction processing accounts in accordance with an exemplary embodiment of the present invention. Method 500 allows merchant accounts to be set up by employees with minimal training or skills, limits employee access to confidential data, and prevents employees from being allowed to make mistakes or errors that could expose the payment processing organization to risk.

Method 500 begins at 502 where merchant profile data is received. In one exemplary embodiment, the merchant profile data can include the number of transactions, average ticket size, merchant physical location data, whether the merchant will be handling card not present data, and other suitable data. The method then proceeds to 504.

At 504, transaction pricing data is generated. In one exemplary embodiment, transaction pricing data can be generated by assigning one or more target rates to the merchant, by selecting tiered rates, or in other suitable manners. The method then proceeds to 506.

At 506, it is determined whether profit targets have been reached based on the merchant account data and pricing data. For example, profit targets can be based on a contribution margin absolute value, contribution margin percentage, or other suitable data. If it is determined at 506 that the profit targets have been reached, the method proceeds to 508 where the merchant is approved for processing. Otherwise the method proceeds to 510.

At 510, the appropriate approval level is determined, such as based on bank card sales volume, a threshold margin, or other suitable data. The relevant approval level designee or group of designees can be notified, or other suitable processes can be used. The method then proceeds to 512.

At 512 it is determined whether approval for the merchant has been granted. If approval has been granted, the method proceeds to 514 and the merchant is set up for processing. Otherwise, the method proceeds to 516 where alternatives are presented. In one exemplary embodiment, alternatives can include changes to one or more fields, tiers, pricing targets, or other suitable data that could allow the merchant to meet predetermined profit targets. The method then proceeds to 518.

At 518, it is determined whether the alternatives have been accepted. If the alternatives have been accepted the method proceeds to 520 and the merchant is approved for payment processing. Otherwise the method proceeds to 520 and the merchant is referred to a third party processor, such as one handling higher risk merchants, one handling lower volume merchants, an affiliate to the payment processor, or other suitable third parties.

In operation, method 500 allows a merchant to be configured for payment transaction processing and a decision to be made on whether the merchant should be processed based on risk levels, payment processing levels, contributions to profit margin, or other suitable data. Method 500 allows a user to be guided through the transaction pricing process without providing the user with access to confidential and proprietary data that could be provided to competitors, merchants or other parties.

Figure 6:
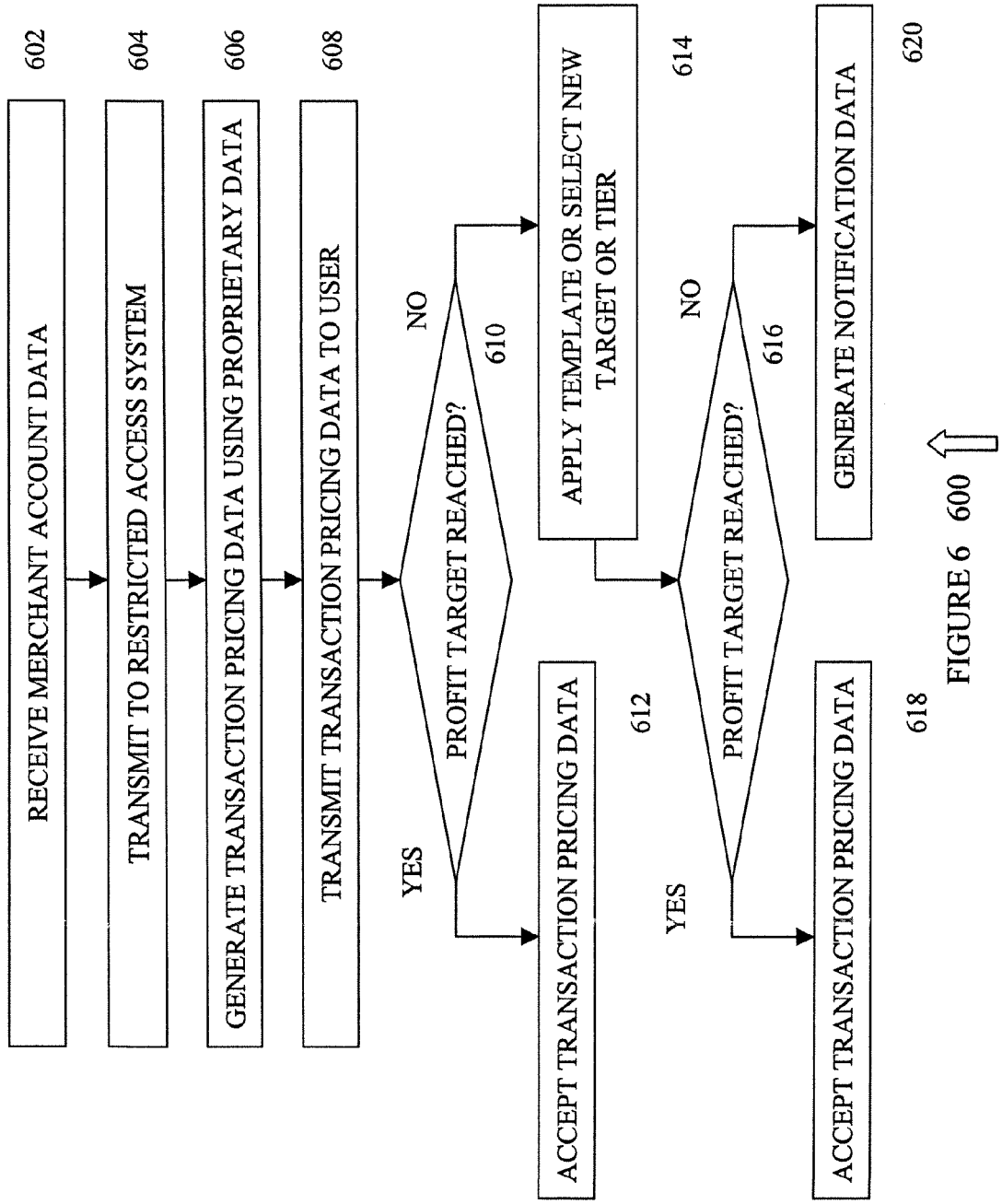
FIG. 6 is a flow chart of a method for providing merchant transaction pricing data in accordance with an exemplary embodiment of the present invention.

FIG. 6 is a flow chart of a method 600 for providing merchant transaction pricing data in accordance with an exemplary embodiment of the present invention. Method 600 begins at 602 where merchant account data is received. The method then proceeds to 604 where the merchant account data is transmitted to a restricted access system, such as a system that can only be accessed by users having certain predetermined authorization levels, users that are operating terminals in the predetermined location, or other suitable users. The method then proceeds to 606.

At 606, transaction pricing data is generated using proprietary data, such as tier data, merchant set up and management data, or other suitable data. The method then proceeds to 608.

At 608, transaction pricing data is transmitted to the user for presentation or review with a merchant. The method then proceeds to 610 where it is determined whether profit targets have been reached. If the profit targets have been reached, the method proceeds to 612 where the transaction pricing data is accepted for presentation to the merchant. Otherwise, the method proceeds to 614 where a template, new target, tier value, or other suitable data is applied to the transaction pricing data, such as by requesting additional transactional pricing data from the proprietary source. The method then proceeds to 616.

At 616 it is determined whether the profit target has been reached. If the profit target has not been reached then notification data is generated to request approval for handling of the merchant. Otherwise, the method proceeds to 618 where transaction pricing data is accepted.

In operation, method 600 allows the user to obtain merchant pricing data for a merchant account transaction processing pricing so as to qualify merchants for processing by an organization. Method 600 restricts user access to proprietary pricing data while allowing the user to determine whether the merchant account meets profit targets.

Figure 7:
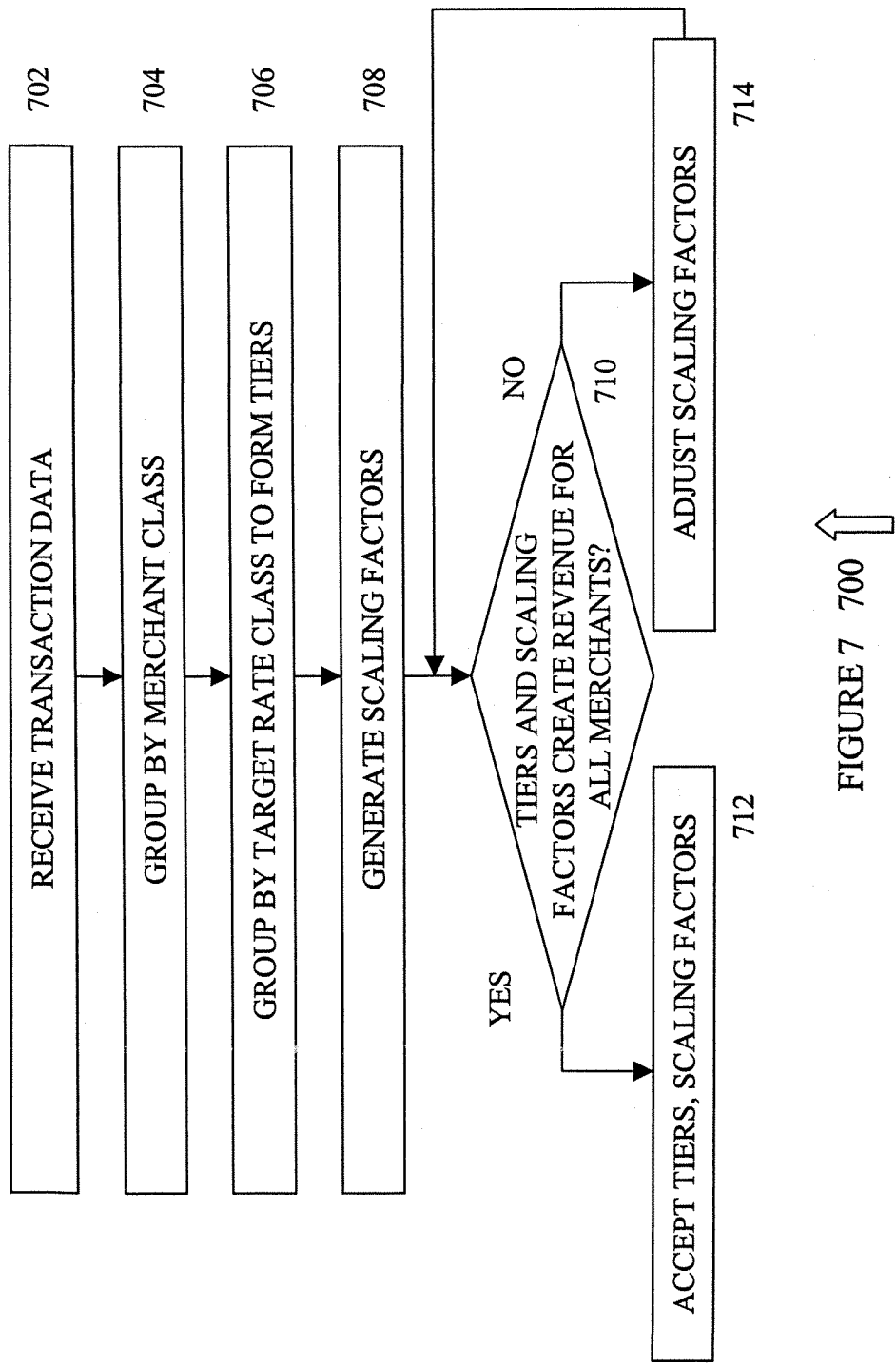
FIG. 7 is a flow chart of a method for generating pricing tiers in accordance of an exemplary embodiment of the present invention.

FIG. 7 is a flow chart of a method 700 for generating pricing tiers in accordance of an exemplary embodiment of the present invention. Method 700 begins at 702 where transaction data for a class of merchants is received. In one exemplary embodiment, the transaction data can include transaction data that is processed by a payment processor with cardholder identifying information extracted so as to allow the payment data to be processed without violating legal requirements for maintaining cardholder data privacy. The method then proceeds to 704.

At 704, the transaction data is grouped by merchant classes. In one exemplary embodiment, the merchant classes can be assigned dynamically, based on merchant characteristics for merchants that are in unrelated fields but that are performing related activities, or other suitable merchants. The method then proceeds to 706.

At 706, target rate classes are grouped to form tiers for each merchant class. In one exemplary embodiment, a target rate class can include target data that is based on target rates set up by one or more payment networks, historical data, or other suitable data that can be used to identify groups of target rate classes for groups of classes of merchants. In this exemplary embodiment, three sets of tiered data can be offered, where the first set includes a single tier having a predetermined rate for processing payment transactions (such as a fee equal to X1% of the total transaction value for all transactions), a double tier having two predetermined rates for processing payment transactions (such as a first fee equal to X2% of the total transaction value for transactions meeting predetermined criteria and a second fee equal to Y2% of the total transaction value for all other transactions), and a triple tier having two predetermined rates for processing payment transactions (such as a first fee equal to X3% of the total transaction value for transactions meeting first predetermined criteria, a second fee equal to Y3% of the total transaction value for transactions that do not meet the first predetermined criteria but which meet second predetermined criteria, and a third fee equal to Z3% of the total transaction value for all other transactions). The predetermined criteria can be set by card issuing organizations or in other manners, and can relate to transaction indicators that are used to identify risk factors for transactions, such as the type of transaction (e.g. card present, card not present mail/phone order, card not present Internet order), the type of goods or services being purchased (e.g. restaurant, supermarket, or lodging), or other indicators. The method then proceeds to 708.

At 708, scaling factors are generated where suitable for a tier. In one exemplary embodiment, a tier can include one, two, three, or other suitable integer numbers of target rates, plus a scaling factor that is based on remaining target rates. For example, if there are three tiers having transaction processing rates X3, Y3, and Z3, then the scaling factors can be the difference between the three transaction processing rates, such as 0.5% between X3 and Y3, and an additional 0.5% between Y3 and Z3. In this exemplary embodiment, using a scaling factor simplifies the pricing for a prospective merchant and allows the merchant to make a decision on whether or not to allow a payment processor process transactions for the merchant. The method then proceeds to 710.

At 710, it is determined whether the tiers and scaling factors create revenue for all sampled merchants within the class. For example, there may be one or more outlying merchants in a class of merchants for which it is determined that a tier does not generate revenue. In this exemplary embodiment, the tiers or scaling factors can be adjusted, the merchant can be reallocated, or other suitable processes can be performed. If it is determined that the tier or scaling factors do not create revenue for all merchants, the scaling factors can be adjusted, the merchant can be reallocated to different class, or other suitable processes are performed. The method then returns to 710. Otherwise, if it is determined that the tiers and scaling factors create adequate revenue for all merchants, the method proceeds to 712 where the tiers and scaling factors are accepted. For example, three tiers can be used where a first tier has a single rate 2.2%, a second tier has two rates of 1.7% for qualifying transactions and 2.7% for non-qualifying transactions, and a third tier has three rates of 1.6% for qualifying transactions, 2.1% for mid-qualifying transactions, and 2.6% for non-qualifying transactions. In this exemplary embodiment, the scaling factor for the second tier is 1.0% and the scaling factors for the third tier are 0.5% and 0.5%. If it is determined that the tiers and scaling factors are not profitable, such as based on historical data or other suitable analyses, merchants can be assigned to other tier classes, the scaling factors and tiers can be adjusted, or other suitable modifications can be made.

In operation, method 700 allows tiers and scaling factors for classes of merchants to be generated. These tiers and scaling factors can be based on proprietary transaction data that is accumulated by a payment processor over time, proprietary merchant taxonomy data that is used to group merchants based on certain merchant characteristics and merchant account data, and other suitable data. Method 700 thus allows a payment processor to decrease the risk of processing payments by charging payment processing rates that reflect the actual risk of processing payments for a merchant.

Although exemplary embodiments of a system and method of the present invention have been described in detail herein, those skilled in the art will also recognize that various substitutions and modifications can be made to the systems and methods without departing from the scope and spirit of the appended claims.

What is claimed is:

1. A system operating on a processor to manage merchant payment transaction processing accounts, the system configured to:
   receive merchant account data;
   transmit the merchant account data to a system having access restricted to a predetermined set of users;
   display one or more algorithms used to generate payment transaction processing pricing data to a user;
   generate the payment transaction processing pricing data at the system using the one or more algorithms and the merchant account data;
   provide the payment transaction processing pricing data to the user;
   receive merchant historical transaction data of a predetermined period of time of a merchant associated with the merchant account data; and
   generate merchant target data related to profitability targets.

2. The system of claim 1 further comprising a merchant initialization system configured to receive the merchant account data from a user.

3. The system of claim 1 further comprising a transaction pricing system configured to receive the merchant account data and to provide the payment transaction processing pricing data in response to the merchant account information.

4. The system of claim 1 further comprising an authorization system configured to obtain approval of modified payment transaction processing pricing data if one or more profit targets, based on profits that are realized by a payment processor from an aggregate of a plurality of transactions over a predetermined time period, are not reached based on the payment transaction processing pricing data.

5. The system of claim 1 wherein user access to one or more merchant account pricing algorithms that are used to generate the payment transaction processing pricing data in response to the merchant account data is restricted to a predetermined set of users.

6. The system of claim 1 further comprising the transaction pricing system configured to receive the merchant account information and a target transaction profit rate and generating merchant revenue level data using the target transaction profit rate.

7. The system of claim 6 wherein the transaction pricing system further comprises a processor rules system configured to receive a plurality of target transaction rates and generating a user-selectable target transaction rate interface.

8. The system of claim 1 further comprising a transaction pricing system configured to receive the merchant account data and a tiered transaction rate based on two or more target transaction rates and to generate merchant revenue data.

9. The system of claim 8 wherein the transaction pricing system further comprises a historical trend system configured to receive merchant class data and transaction data of a plurality of merchants associated with the merchant class data and to generate a profile of percentage transaction allocations between three or more different transaction processors to each of a plurality of classes of merchants.

10. The system of claim 1 further comprising a merchant guideline system configured to receive merchant revenue data and to generate approval level data that indicates a required approval level associated with activating an account of the merchant when the merchant revenue data is below a predetermined amount.

11. The system of claim 1 further comprising a merchant template system configured to receive merchant account data and merchant revenue data and generating merchant account modification data when the merchant revenue data is below a predetermined amount.

12. A system operating on a processor to manage merchant payment transaction processing accounts, the system configured to:
 receive merchant account application data that defines a plurality of data fields for initiating a new merchant account;
 transmit the merchant account application data to a system having access restricted to a predetermined set of users;
 display one or more algorithms used to generate merchant account pricing data to a user;
 generate the merchant account pricing data at the system using the one or more algorithms and the merchant account application data;
 provide the merchant account pricing data to the user;
 receive merchant historical transaction data of a predetermined period of time of a merchant associated with the merchant account application data; and
 generate merchant target data related to profitability targets.

13. The system of claim 12 further comprising a merchant initialization system configured to receive the merchant account application data from a user.

14. The system of claim 12 further comprising a transaction pricing system configured to receive the merchant account application data and to provide the merchant account pricing data in response to the merchant account application data.

15. The system of claim 12 further comprising an authorization system configured to obtain approval of modified merchant account pricing data if one or more profit targets, based on profits that are realized by a payment processor from an aggregate of a plurality of transactions over a predetermined time period, are not reached based on the merchant account pricing data.

16. The system of claim 12 wherein user access to one or more merchant account pricing algorithms that are used to generate the merchant account pricing data in response to the merchant account data is restricted to a predetermined set of users.

17. A system operating on a processor to manage transaction processing accounts, the system configured to:
 receive account application data that defines a plurality of data fields for initiating a new account;
 transmit the account application data to a system having access restricted to a predetermined set of users;
 display one or more algorithms used to generate account pricing data to a user;
 generate the account pricing data at the system using the one or more algorithms and the account application data;
 provide the account pricing data to the user;
 receive historical transaction data of a predetermined period of time of a user associated with the account application data; and
 generate target data related to profitability targets.

18. The system of claim 17 further comprising an account initialization system configured to receive the account application data from the user.

19. The system of claim 17 further comprising a transaction pricing system configured to receive the account application data and to provide the account pricing data in response to the account application data.

20. The system of claim 17 further comprising an authorization system configured to obtain approval of modified account pricing data if one or more profit targets, based on profits that are realized from an aggregate of a plurality of transactions over a predetermined time period, are not reached based on the account pricing data.

* * * * *